United States Patent
Kim et al.

(10) Patent No.: US 7,450,860 B2
(45) Date of Patent: Nov. 11, 2008

(54) APPARATUS AND METHOD FOR FREQUENCY-SHIFT-KEYING OPTICAL TRANSMISSION

(75) Inventors: Hoon Kim, Suwon-si (KR); Yun-Je Oh, Yongin-si (KR); Seong-Taek Hwang, Pyeongtaek-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 479 days.

(21) Appl. No.: 11/147,705

(22) Filed: Jun. 8, 2005

(65) Prior Publication Data

US 2006/0029395 A1    Feb. 9, 2006

(30) Foreign Application Priority Data

Aug. 5, 2004    (KR) .................... 10-2004-0061649

(51) Int. Cl.
  *H04B 10/04*    (2006.01)
  *H04B 10/12*    (2006.01)
(52) U.S. Cl. ...................... 398/183; 398/187
(58) Field of Classification Search ............... 398/183
  See application file for complete search history.

(56) References Cited

U.S. PATENT DOCUMENTS

| | | | | |
|---|---|---|---|---|
| 3,600,587 | A * | 8/1971 | Smith | 398/187 |
| 5,107,358 | A * | 4/1992 | Hodgkinson et al. | 398/79 |
| 5,440,415 | A * | 8/1995 | Mekawi et al. | 398/76 |
| 6,539,131 | B1 * | 3/2003 | Gill et al. | 385/3 |
| 6,865,348 | B2 * | 3/2005 | Miyamoto et al. | 398/183 |
| 2003/0117612 | A1 * | 6/2003 | Wight et al. | 356/73.1 |
| 2003/0147116 | A1 * | 8/2003 | Shpantzer et al. | 359/264 |
| 2003/0189745 | A1 * | 10/2003 | Kikuchi et al. | 359/237 |
| 2004/0136730 | A1 * | 7/2004 | Fuse et al. | 398/188 |
| 2004/0208647 | A1 * | 10/2004 | Gill et al. | 398/188 |

FOREIGN PATENT DOCUMENTS

| | | |
|---|---|---|
| JP | 61-292617 | 12/1986 |
| JP | 02-114241 | 4/1990 |
| JP | 04-112589 | 4/1992 |
| JP | 05-095331 | 4/1993 |

(Continued)

OTHER PUBLICATIONS

Y. Miyamoto et al.; "High-Speed CPFSK WDM Signal Transmission Using PLC-LN Hybrid Asymmetric MZ Modulator;" Optical Fiber Communication Conference 2005; Mar. 6-11, 2005; XP 010831315.

(Continued)

*Primary Examiner*—Kenneth Vanderpuye
*Assistant Examiner*—Thi Le
(74) *Attorney, Agent, or Firm*—Cha & Reiter, LLC

(57) ABSTRACT

An optical transmission apparatus employing an FSK scheme is disclosed. The optical transmission apparatus includes a light generator arranged to generate a first tone signal having a first frequency and a second tone signal having a second frequency. The optical transmission apparatus also includes a light modulator including a second modulator for selectively outputting one of the first tone signal and the second tone signal input from the light generator according to input data.

8 Claims, 3 Drawing Sheets

FOREIGN PATENT DOCUMENTS

| | | |
|---|---|---|
| JP | 2001-050860 | 2/2001 |
| JP | 2003-051809 | 2/2003 |
| JP | 2004-135139 | 4/2004 |

OTHER PUBLICATIONS

T. Kawanishi et al.; "High-Speed Optical FSK Modulator For Optical Packet Labeling;" Optical Fiber Communication Conference 2004; Feb. 23, 2004; XP 002357015.

N. Deng et al.; "All-Optical OOK Label Swapping On OFSK Payload in Optical Packet Networks;" Optical Fiber Communication Conference 2004; Feb. 23, 2004; XP 002357016.

J. Nayyer et al.; "Proposal of an Asymmetric Mach-Zehnder Structure with Improved Optical Modulation Characteristics;" Australian Conference on Optical Fibre Technology; 1994; XP 000600271.

Kawanishi, T., et al.; "High-Speed Optical FSK Modulator for Optical Packet Labeling;" Optical Fiber Communication Conference 2004; Feb. 2004.

Deng, N., et al.; "All-Optical OOK Label Swapping on OFSK Payload in Optical Packet Networks;" Optical Fiber Communication Conference 2004; Feb. 2004.

\* cited by examiner

APPARATUS AND METHOD FOR FREQUENCY-SHIFT-KEYING OPTICAL TRANSMISSION

CLAIM OF PRIORITY

This application claims priority to an application entitled "Apparatus and method for frequency-shift-keying optical transmission," filed in the Korean Intellectual Property Office on Aug. 5, 2004 and assigned Serial No. 2004-61649, the contents of which are incorporated herein by reference.

BACKGROUND OF THE INVENTION

1. Field of the Invention

The present invention relates to an optical transmission apparatus and an optical transmission method, and more particularly to an apparatus and a method for optical transmission including a frequency-shift-keying ('FSK') scheme.

2. Description of the Related Art

FSK schemes are shift-keying schemes that load information on the frequency of an optical signal. FSK schemes have a higher reception sensitivity than that of the conventional on-off keying schemes (e.g., by about 3 dB). FSK schemes also allow for strong fiber nonlinearity. Since the information is included in the frequency of an optical signal other than the intensity of the optical signal, FSK schemes are rarely affected by the kerr nonlinearity of an optical fiber. Moreover, since the carrier frequency of a signal is suppressed, FSK schemes are strong against a Brillouin nonlinearity effect. FSK schemes can also accept strong optical fiber nonlinearity as compared with PSK schemes (phase-shift-keying). Since this means that a signal can be transmitted over a long distance without signal reproduction, a long distance optical transmission system can be more effectively achieved by means of such a characteristic.

In order to generate an FSK signal, it is necessary to provide an apparatus capable of generating different frequencies according to electric data signals. The conventional method for generating the FSK signal uses the chirping of a laser diode. Since an optical signal output from the laser diode has a frequency changed according to electric current applied to the laser diode, the FSK signal can be generated by means of the above characteristic of the laser diode.

FIG. 1 is a circuit diagram showing an example of a conventional optical transmission apparatus 100 employing a typical FSK scheme. The optical transmission apparatus 100 includes a distributed feedback laser (DFB) 110 and a bias-tee circuit 120.

The distributed feedback laser 110 generates two tone signals having different frequencies according to input data signals. When '0' bit data is input, the distributed feedback laser 110 generates a first tone signal. When '1' bit data is input, the distributed feedback laser 110 generates a second tone signal. This is because the distributed feedback laser 110 has a changed output frequency and intensity according to the intensity of input data. Further, in addition to the data signal, a bias signal having a constant electric current is input to the distributed feedback laser 110. When such a direct modulation scheme is employed, both the output frequency and the output intensity of the distributed feedback laser 110 are modulated and an output signal is distorted.

The bias-tee circuit 120 includes an inductor L 130 disposed between a bias terminal and the distributed feedback laser 110 in order to block alternating current. A condenser C 140 is disposed between a data terminal and the distributed feedback laser 110 in order to block direct current.

FIG. 2 is a circuit diagram of the second example of a conventional optical transmission apparatus 200 employing a typical FSK scheme.

The optical transmission apparatus 200 includes a distributed feedback laser 210, an intensity modulator MOD 260, an inverting amplifier 250 and a bias-tee circuit 220.

The distributed feedback laser 210 may generate two tone signals having different frequencies according to input data signals. When '0' bit data is input, the distributed feedback laser 210 generates a first tone signal. When '1' bit data is input, the distributed feedback laser 210 generates a second tone signal. In addition to the data signal, a bias signal having a constant electric current is input to the distributed feedback laser 210.

The inverting amplifier 250 inverts the input data signal to output the inverted data signal to the intensity modulator 260.

The intensity modulator 260 changes the intensity of the tone signal input from the distributed feedback laser 210 according to the input inverted data signal. The intensity modulator 260 offsets the distortion of an output signal due to intensity change of the data signal, which is input to the distributed feedback laser 210, by means of the inverted data signal. Therefore, the output signal due of the intensity modulator 260 has a constant intensity regardless of the frequency of the output signal.

The bias-tee circuit 220 includes an inductor L 230 disposed between a bias terminal and the distributed feedback laser 210 in order to block alternating current. A condenser C 240 is disposed between a data terminal and the distributed feedback laser 210 in order to block direct current.

The optical transmission apparatus 200 has a reduced intensity distortion of an output signal as compared with the optical transmission apparatus 100. However, since the optical transmission apparatus 200 also employs a direct modulation scheme, the optical transmission apparatus 200 has a limitation in a modulation speed. Typically, a modulation bandwidth of a laser is determined by a relaxation oscillation frequency of the laser. The relaxation oscillation frequency increases by the square root of a bias current of the laser, but is generally less than 20 GHz. Accordingly, it is difficult to apply the relaxation oscillation frequency to a high speed transmission system of more than 40 Gbps. Further, since an optical frequency generated by the chirping of a laser has a phase somewhat different from that of an applied current, it is difficult to generate a clean FSK signal having a small chirping from the optical frequency.

SUMMARY OF THE INVENTION

One aspect of the present invention relates to an optical transmission apparatus and method employing an FSK scheme and capable of supporting a modulation speed of more than 40 Gbps.

One embodiment of the present invention is directed to an optical transmission apparatus employing an FSK scheme including a light generator for generating a first tone signal having a first frequency and a second tone signal having a second frequency. The optical transmission apparatus also includes a light modulator including a second modulator for selectively outputting one of the first tone signal and the second tone signal input from the light generator according to input data.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Hereinafter, embodiments according to the present invention will be described with reference to the accompanying drawings. For the purposes of clarity and simplicity, a detailed description of known functions and configuration incorporated herein will be omitted as it may obscure the subject matter of the present invention.

Figure 1:
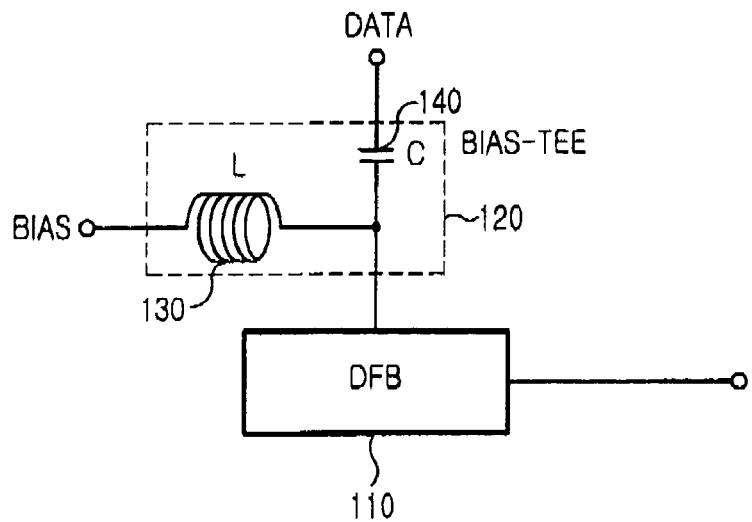
FIG. 1 is a circuit diagram showing the first example of a conventional optical transmission apparatus employing a typical FSK scheme.
Figure 2:
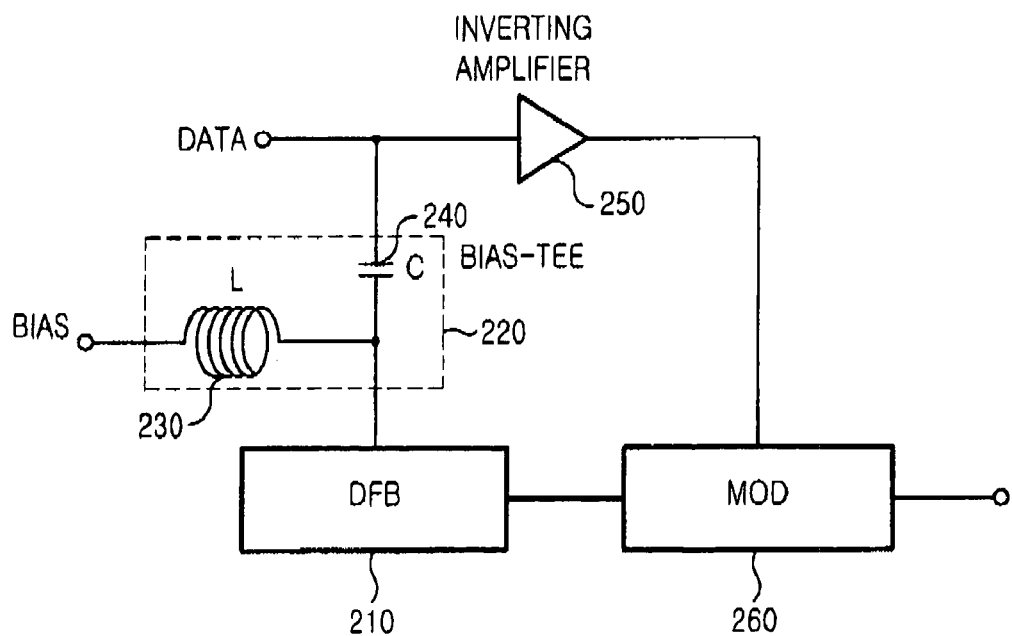
FIG. 2 is a circuit diagram of the second example of a conventional optical transmission apparatus employing a typical FSK scheme.
Figure 3:
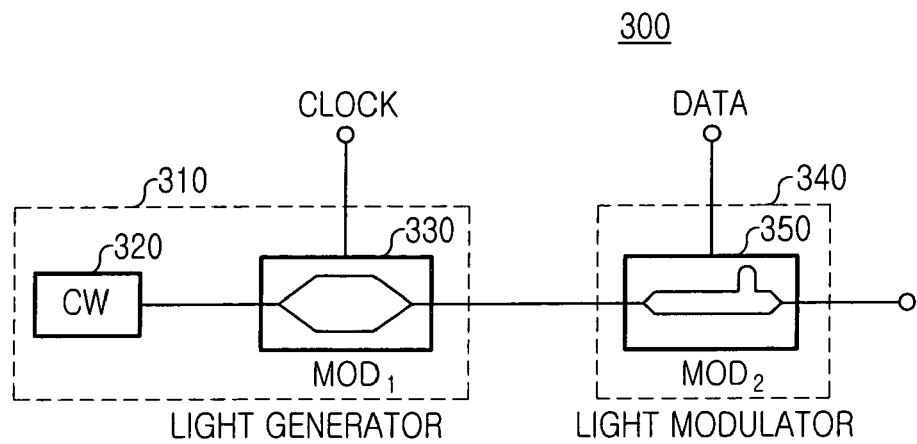
FIG. 3 is a block diagram showing an optical transmission apparatus employing an FSK scheme according to a first embodiment of the present invention.

FIG. 3 is a block diagram showing an optical transmission apparatus 300 employing an FSK scheme according to a first embodiment of the present invention. The optical transmission apparatus 300 includes a light generator 310 and a light modulator 340.

The light generator 310 generates a first and a second tone signal having frequencies different from each other. The light generator 310 in this embodiment generates a carrier-suppressed return-to-zero ('CSRZ') signal including the first and the second tone signal.

The light generator 310 includes a light source 320 and a first modulator MOD1 330.

The light source 320 includes a continuous wave laser CW and continuously outputs an optical signal having a reference frequency $f_0$.

The first modulator 330 includes a symmetric mach-zehnder modulator containing a first and a second arm of the same length. The symmetric mach-zehnder modulator may employ an X-cut $LiNbO_3$ mach-zehnder modulator as an example. A heat electrode to which a driving signal is applied is disposed between the first arm and the second arm and grounds are disposed at each outside of the first arm and the second arm. The first modulator 330 receives the optical signal from the light source 320 and the driving signal. The driving signal is a clock signal and has a frequency $f_d/2$ corresponding to ½ of a clock frequency $f_d$ of data. The first modulator 330 receives the optical signal from the light source 320 to generate the CSRZ signal including a first tone signal having a first frequency $f_1$ and a second tone signal having a second frequency $f_2$. The first frequency has a value of $(f_0-f_d/2)$ and the second frequency has a value of $(f_0+f_d/2)$. The first tone signal represents '0' bit and the second tone signal represents '1' bit. However, this is a selective item. For example, the first tone signal may represent '1' bit and the second tone signal may represent '0' bit.

The light modulator 340 selectively outputs the first tone signal or the second tone signal according to the input data of the CSRZ signal input from the light generator 310, and includes a second modulator MOD2 350.

The second modulator 350 includes an asymmetric mach-zehnder modulator containing a first and a second arm of different lengths. The asymmetric mach-zehnder modulator may employ an X-cut $LiNbO_3$ mach-zehnder modulator as an example. A heat electrode to which a data signal is applied is disposed between the first arm and the second arm and grounds are disposed at each outside of the first arm and the second arm. A length difference between the first arm and the second arm corresponds to ½ bit. For instance, when a modulation speed is 40 Gbps, since a bit time is 25 ps, the length difference between the first arm and the second arm corresponds to 12.5 ps.

Figure 4:
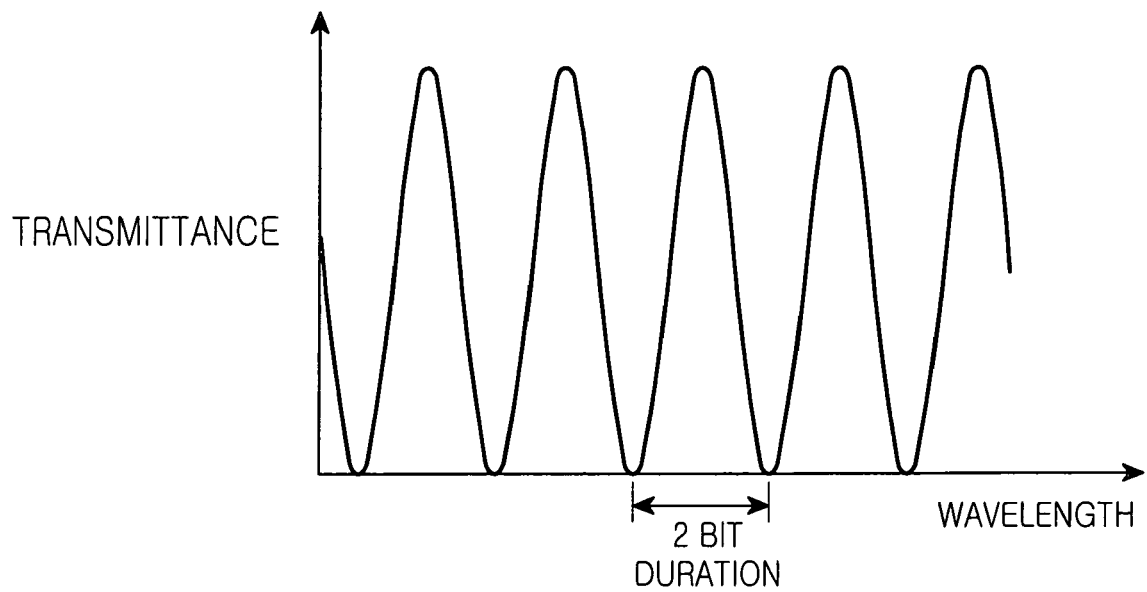
FIG. 4 is a graph showing the wavelength response characteristic of the second modulator shown in FIG. 3.

FIG. 4 is a graph showing the wavelength response characteristic of the second modulator 350. As shown in FIG. 4, the wavelength response characteristic of the second modulator 350 shows a sine waveform. The transmittance of the second modulator 350 shows a sine waveform periodically repeating the rise and fall according to wavelength change. The wavelength response characteristic of the second modulator 350 has a period determined by the length difference between the first arm and the second arm. Since the length difference between the first arm and the second arm corresponds to ½ bit, the period of the wavelength response characteristic corresponds to 2 bit duration. The wavelength response characteristic of the second modulator 350 may be measured by means of an erbium doped fiber amplifier (EDFA) outputting a broadband amplified spontaneous emission (broadband ASE) or a wavelength tunable laser.

Referring to FIG. 3 again, the second modulator 350 receives the CSRZ signal and the data signal from the first modulator 330, and selectively outputs the first tone signal or the second tone signal according to the input data. When a bit of the input data is '0', the second modulator 350 selectively outputs the first tone signal. In contrast, when a bit of the input data is '1', the second modulator 350 selectively outputs the second tone signal. The second modulator 350 has a wavelength response characteristic wavelength-shifted according to an applied voltage level. Further, the wavelength response characteristic of the second modulator 350 is wavelength-shifted by wavelength variation corresponding to '1' bit with respect to voltage level difference of '0' bit and '1' bit.

Figure 5:
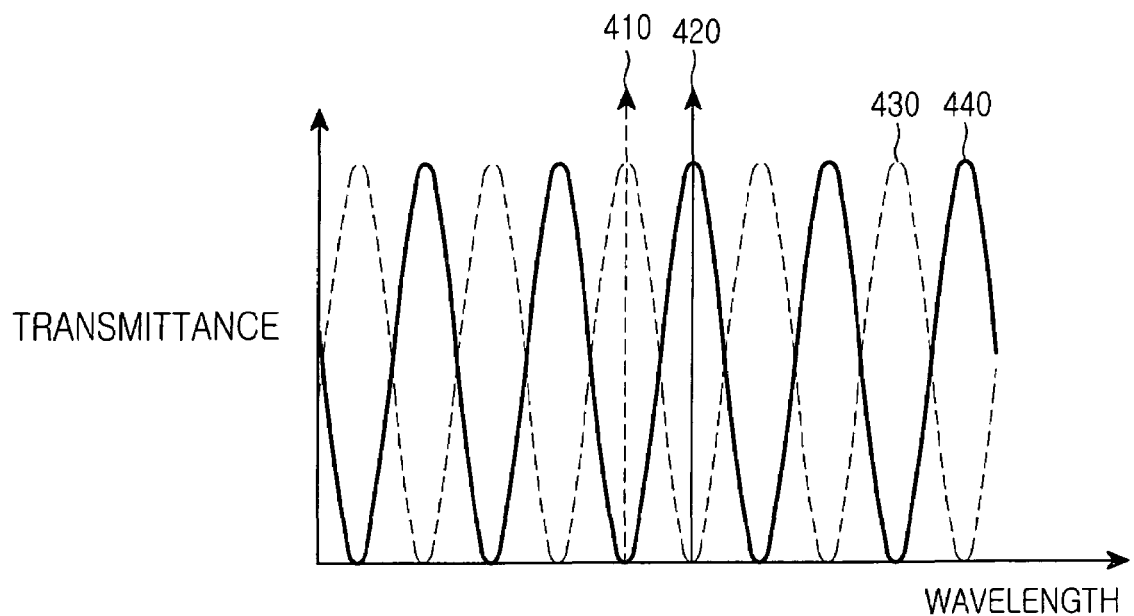
FIG. 5 is a graph illustrating the wavelength-shift of the wavelength response characteristic of the second modulator.

FIG. 5 is a graph illustrating the wavelength-shift of the wavelength response characteristic of the second modulator 350. FIG. 5 shows a wavelength response characteristic 430 when '0' bit is applied, a wavelength response characteristic 440 when '1' bit is applied, a first tone signal 410 and a second tone signal 420. When '0' bit is applied to the second modulator 350, a maximum transmission point of the wavelength response characteristic 430 coincides with the first tone signal 410 and a minimum transmission point of the wavelength response characteristic 430 coincides with the second tone signal 420. In this case, the second modulator 350 selectively outputs the first tone signal 410 having a first frequency. In contrast, when '1' bit is applied to the second modulator 350, a maximum transmission point of the wavelength response characteristic 440 coincides with the second tone signal 420 and a minimum transmission point of the wavelength response characteristic 440 coincides with the first tone signal 410. In this case, the second modulator 350 selectively outputs the second tone signal 420 having a second frequency.

Figure 6:
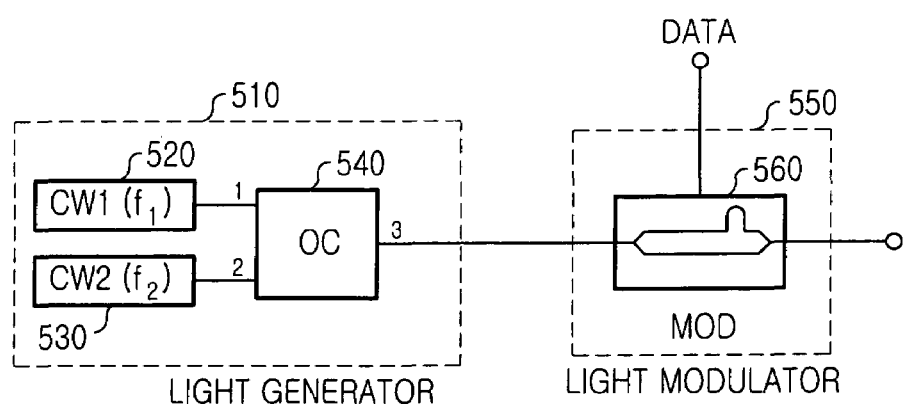
FIG. 6 is a block diagram showing an optical transmission apparatus employing an FSK scheme according to a second embodiment of the present invention

FIG. 6 is a block diagram showing an optical transmission apparatus 500 employing an FSK scheme according to a second embodiment of the present invention. The optical transmission apparatus 500 includes a light generator 510 and a light modulator 550. Since the optical transmission apparatus 500 is similar to the optical transmission apparatus 300 shown in FIG. 3 and the light generator 510 has a construction different from that of the light generator 310, a description of the same elements will be omitted.

The light generator 510 includes a first and a second light source 520 and 530, and an optical coupler OC 540, and generates a first and a second tone signal having frequencies different from each other. The first light source 520 outputs a first tone signal having a first frequency $f_1$ and the second light source 530 outputs a second tone signal having a second frequency $f_2$. The first and the second light source 520 and 530 include continuous wave lasers CW1 and CW2 for continuously outputting optical signals having predetermined frequencies, respectively. The optical coupler OC 540 has a first to a third port 540.1 to 540.3. The first port 540.1 is connected to the first light source 520, the second port 540.2 is connected to the second light source 530, and the third port 540.3 is connected to the light modulator 550. The optical coupler OC 540 couples the first tone signal input to the first port 540.1 and the second tone signal input to the second port 540.2 and outputs the coupled tone signal to the third port 540.3. The optical coupler OC 540 includes a wavelength selective coupler WSC, a wavelength division multiplexer WDM, etc.

The light modulator 550 selectively outputs one of the first tone signal or the second tone signal input from the light generator 510 according to input data. Further, the light modulator 550 includes a modulator 560 connected to the third port 540.3 of the optical coupler OC 540.

The modulator 560 includes an asymmetric mach-zehnder modulator containing a first and a second arm of different lengths. The asymmetric mach-zehnder modulator may employ an X-cut LiNbO$_3$ mach-zehnder modulator as an example. A heat electrode to which a data signal is applied is disposed between the first arm and the second arm and grounds are disposed at each outside of the first arm and the second arm. A length difference between the first arm and the second arm corresponds to ½ bit. For instance, when a modulation speed is 40 Gbps, since a bit time is 25 ps, the length difference between the first arm and the second arm corresponds to 12.5 ps. When a bit of the input data is '0', the modulator 560 selectively outputs the first tone signal. In contrast, when a bit of the input data is '1', the modulator 560 selectively outputs the second tone signal. The wavelength response characteristic of the modulator 560 is wavelength-shifted according to an applied voltage level. Further, the wavelength response characteristic of the modulator 560 is wavelength-shifted by wavelength variation corresponding to '1' bit with respect to voltage level difference of '0' bit and '1' bit.

As described above, since an optical transmission apparatus employing an FSK scheme and a method thereof according to various embodiments of the present invention employ an external modulation scheme instead of a direct modulation scheme, the optical transmission apparatus and the transmission apparatus method can be used in generating a high speed signal of more than 40 Gbps. Further, such optical transmission apparatus and transmission apparatus methods employ an FSK scheme to prevent chirping and signal distortion from occurring, so that an optimal FSK signal can be generated, thereby improving the performance of an optical transmission system.

While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for optical transmission using an FSK scheme, the apparatus comprising:
    a light generator arranged to generate a first tone signal having a first frequency $f_1$ and a second tone signal having a second frequency $f_2$; and
    a light modulator including an asymmetric mach-zehnder modulator containing a first and a second arm of different lengths and arranged to selectively output one of the first tone signal and the second tone signal input from the light generator according to input data,
    wherein a difference between the first frequency $f_1$ and the second frequency $f_2$ corresponds to a clock frequency $f_d$ of the data, a length difference between the first arm and the second arm corresponds to ½ bit of the data, and transmittance of the asymmetric mach-zehnder modulator shows a sine waveform repeating a rise and fall with a 2 bit duration according to a wavelength change, and
    wherein the asymmetric mach-zehnder modulator has a wavelength response characteristic wavelength-shifted according to an applied voltage level, the asymmetric mach-zehnder modulator selectively outputs the first tone signal when a bit of the input data is '0', and the asymmetric mach-zehnder modulator selectively outputs the second tone signal when the bit of the input data is '1'.

2. The apparatus as claimed in claim 1, wherein the light generator includes a light source arranged to generate an optical signal having a reference frequency $f_0$ and a mach-zehnder modulator arranged to generate a carrier-suppressed return-to-zero (CSRZ) signal, which contain the first tone signal having the first frequency $f_1$ and the second tone signal having the second frequency $f_2$, from the optical signal according to a driving signal.

3. The apparatus as claimed in claim 2, wherein the light source includes a continuous wave laser.

4. The apparatus as claimed in claim 2, wherein the mach-zehnder modulator of the light generator includes a symmetric mach-zehnder modulator containing a first and a second arm of equal length.

5. The apparatus as claimed in claim 2, wherein the driving signal a clock signal having a frequency corresponding to ½ of the clock frequency $f_d$ of the data.

6. The apparatus as claimed in claim 2, wherein the first frequency has a value of $(f_0-f_d/2)$ and the second frequency has a value of $(f_0+f_d/2)$.

7. The apparatus as claimed in claim 1, wherein the light generator includes a first light source for outputting the first tone signal having the first frequency $f_1$, a second light source for outputting the second tone signal having the second frequency $f_2$, and an optical coupler for coupling the first tone signal and the second tone signal and outputting the coupled tone signal.

8. The apparatus as claimed in claim 7, wherein the first light source and the second light source include continuous wave lasers respectively.

* * * * *